United States Patent
Iijima et al.

(10) Patent No.: US 11,085,324 B2
(45) Date of Patent: Aug. 10, 2021

(54) GAS TURBINE AND GAS TURBINE OPERATING METHOD

(71) Applicant: Mitsubishi Hitachi Power Systems, Ltd., Kanagawa (JP)

(72) Inventors: Takayoshi Iijima, Yokohama (JP); Shinya Hashimoto, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 319 days.

(21) Appl. No.: 15/747,915

(22) PCT Filed: Aug. 4, 2016

(86) PCT No.: PCT/JP2016/072934
§ 371 (c)(1),
(2) Date: Jan. 26, 2018

(87) PCT Pub. No.: WO2017/038371
PCT Pub. Date: Mar. 9, 2017

(65) Prior Publication Data
US 2018/0223686 A1 Aug. 9, 2018

(30) Foreign Application Priority Data
Sep. 2, 2015 (JP) .............................. JP2015-172711

(51) Int. Cl.
*F01D 25/12* (2006.01)
*F02C 7/16* (2006.01)
(Continued)

(52) U.S. Cl.
CPC ............. *F01D 25/12* (2013.01); *F01D 9/065* (2013.01); *F01D 25/162* (2013.01); *F01D 25/24* (2013.01);
(Continued)

(58) Field of Classification Search
CPC . F01D 9/06; F01D 9/065; F01D 17/14; F01D 17/141; F01D 17/148; F01D 25/12;
(Continued)

(56) References Cited

U.S. PATENT DOCUMENTS 4,296,599 A 10/1981 Adamson
8,641,362 B1 2/2014 Liang
(Continued)

FOREIGN PATENT DOCUMENTS

JP 55-137319 10/1980
JP 59-173527 10/1984
(Continued)

OTHER PUBLICATIONS

International Search Report dated Oct. 11, 2016 in International (PCT) Application No. PCT/JP2016/072934.
(Continued)

*Primary Examiner* — Scott J Walthour
(74) *Attorney, Agent, or Firm* — Wenderoth, Lind & Ponack, L.L.P.

(57) ABSTRACT

A gas turbine is provided with an exhaust diffuser in which an exhaust flow path for circulating exhaust gas from a turbine is formed, and a cooling device for cooling a structure facing the exhaust flow path in the exhaust diffuser. The cooling device has a guide part in which a guide flow path for circulating a cooling medium is formed and which is configured to guide the cooling medium to the structure, and a switching part able to switch between a first state where a flow rate of the cooling medium flowing through the guide flow path is a first flow rate corresponding to a flow rate during a rated operation and a second state where the flow rate of the cooling medium is a second flow rate higher than the first flow rate.

6 Claims, 5 Drawing Sheets

(51) Int. Cl.
  *F01D 25/24* (2006.01)
  *F01D 25/30* (2006.01)
  *F01D 9/06* (2006.01)
  *F01D 25/16* (2006.01)

(52) U.S. Cl.
  CPC ........... *F01D 25/30* (2013.01); *F01D 25/305* (2013.01); *F02C 7/16* (2013.01); *F05D 2260/201* (2013.01)

(58) Field of Classification Search
  CPC ........ F01D 25/24; F01D 25/30; F01D 25/305; F02C 7/18
  See application file for complete search history.

(56) References Cited

U.S. PATENT DOCUMENTS

| | | |
|---|---|---|
| 8,756,911 B1 | 6/2014 | Liang |
| 2010/0322759 A1 | 12/2010 | Tanioka |
| 2012/0186261 A1 | 7/2012 | Toprani et al. |
| 2015/0078887 A1 | 3/2015 | Ueda et al. |

FOREIGN PATENT DOCUMENTS

| | | |
|---|---|---|
| JP | 2012-149640 | 8/2012 |
| JP | 2013-174134 | 9/2013 |
| WO | 2009/087847 | 7/2009 |

OTHER PUBLICATIONS

Written Opinion of the International Searching Authority dated Oct. 11, 2016 in International (PCT) Application No. PCT/JP2016/072934.

GAS TURBINE AND GAS TURBINE OPERATING METHOD

This application claims priority with respect to Japanese Application No. 2015-172711 filed on Sep. 2, 2015, the content of which is incorporated herein by reference.

TECHNICAL FIELD

The present invention relates to a gas turbine and a gas turbine operating method.

BACKGROUND ART

A gas turbine is typically provided with a compressor, a combustor, a turbine, and an exhaust chamber. The compressor compresses outside air to generate compressed air. The combustor mixes fuel with the compressed air, and burns the mixture to generate combustion gas. The turbine has a rotor that is rotated by the combustion gas. The exhaust chamber is provided on the downstream side of the turbine. The combustion gas that has rotated the rotor of the turbine is discharged as exhaust gas through the exhaust chamber into the atmosphere.

For the sake of higher efficiency, the temperature of the combustion gas supplied to the turbine in this type of gas turbine has become increasingly very high. Therefore, most of the components of the turbine are subject to cooling. The parts configuring the exhaust chamber and the parts surrounding the exhaust chamber are also subject to cooling.

For example, a cooling structure surrounding an exhaust chamber in a gas turbine is disclosed in JP 2013-174134A. In the gas turbine disclosed in JP 2013-174134A, an exhaust diffuser is formed in the exhaust chamber on the downstream of the turbine. The exhaust diffuser has an outer diffuser and an inner diffuser provided between a casing wall and a bearing casing. A strut linked to the casing wall and the bearing casing and a strut cover covering the strut are provided in the exhaust chamber. The gas turbine cools the strut and the strut cover by introducing outside air at atmospheric pressure from outside the casing wall, and circulating said air through a space between the strut and the strut cover.

SUMMARY OF INVENTION

Problems to be Solved by the Invention

By the way, this type of gas turbine sometimes switches an operating state to a turn-down operation in order to cope with fluctuations in electricity demand during the day or at night. In the turn-down operation, the flow rate of the combustion gas passing through the turbine is reduced, and the gas turbine is thus operated at a lower output than during a rated operation. In order to suppress the amount of CO emissions emitted by the gas turbine during the turn-down operation, the combustion temperature must be kept high even when output has been reduced.

However, a turbine expansion ratio becomes smaller when the flow rate of the combustion gas passing through the turbine is decreased. Therefore, the temperature of an exhaust gas rises compared to said temperature during the rated operation because the combustion temperature is kept high. As a result, a metal temperature of a structure like the strut cover exposed to the exhaust gas rises. Therefore, when the gas turbine is operated with the gas turbine output lower than during the rated operation, as in the turn-down operation, a larger amount of a cooling medium, such as air, for cooling structures must be supplied than is supplied during the rated operation. However, increasing the amount of the cooling medium supplied in conjunction with the turn-down operation leads to an over-cooled state during the rated operation, which reduces the efficiency of the gas turbine. Therefore, it is preferable that a cooling effect on the structure in the exhaust gas be enhanced temporarily, without having an impact during the rated operation.

The present invention provides a gas turbine and a gas turbine operating method able to enhance the cooling effect on the structure in the exhaust gas temporarily, without having an impact during the rated operation.

Means for Solving the Problem

The present invention proposes the following means for solving the problems described above.

A gas turbine according to a first aspect of the present invention is provided with an exhaust diffuser in which an exhaust flow path for circulating exhaust gas from a turbine is formed, and a cooling device for cooling a structure facing the exhaust flow path in the exhaust diffuser. The cooling device is provided with a guide part in which a guide flow path for circulating a cooling medium is formed and which guides the cooling medium to the structure, and a switching part able to switch between a first state where a flow rate of the cooling medium circulating through the guide flow path is a first flow rate corresponding to a flow rate during a rated operation and a second state where the flow rate of the cooling medium is a second flow rate higher than the first flow rate.

Using this type of configuration makes it possible to supply the cooling medium at a second flow path higher than the first flow rate by switching from the first state to the second state. Accordingly, by switching the switching part from the first state to the second state, more of the cooling medium can be supplied to the structure than is supplied during the rated operation. Thus, a cooling effect on a structure exposed to exhaust gas can be temporarily raised above said effect during the rated operation. Furthermore, the switching part can be switched so that the state goes from the first state during the rated operation to the second state, which thus makes it possible to prevent the temporarily needed cooling medium at the second flow rate from also flowing during the rated operation. Therefore, it is possible to prevent an over-cooled state that would lower the efficiency of the gas turbine during the rated operation.

The gas turbine according to a second aspect of the present invention is the gas turbine of the first aspect, wherein the switching part may have a valve part having a valve body that is movable so as to narrow a flow path area of the guide flow path in the first state and to widen the flow path area in the second state, and a supply part for supplying the cooling medium at the first flow rate to the structure in a state where the valve body has blocked the guide flow path.

According to this type of configuration, the flow path area of the guide flow path for circulating the cooling medium can be changed easily because the switching part has the valve body. Accordingly, the flow rate of cooling air circulating through the guide flow path can be switched using a simple configuration. Furthermore, the cooling medium at the first flow rate can be supplied to the structure with a high degree of accuracy during the rated operation because the cooling medium at the first flow rate is supplied from the supply part in a state where the valve body has blocked the guide flow path. Accordingly, the needed cooling medium can be stably secured during the rated operation.

The gas turbine according to a third aspect of the present invention is the gas turbine of the second aspect, wherein the supply part may be a through hole formed in the valve body.

Using this type of configuration, the cooling medium at the first flow rate can be supplied to the structure with a high degree of accuracy, even in a case where the valve body has blocked the guide flow path, because the supply part is the through hole formed in the valve body.

The gas turbine according to a fourth aspect of the present invention is the gas turbine of the second aspect, wherein the guide part may have an opening for accepting outside air from outside the exhaust diffuser as the cooling medium, and the supply part may be a linking hole formed in the guide part so as to link the outside of the exhaust diffuser and the guide flow path farther on the structure side than the valve body.

Using this type of configuration makes it possible to form a structure able to supply the cooling medium at the first flow rate without involving the valve body because the supply part is formed in the guide part.

The gas turbine according to a fifth aspect of the present invention is the gas turbine of the first aspect, wherein the switching part may have a valve part having a valve body that is movable so as to narrow a flow path area of the guide flow path in the first state and to widen the flow path area in the second state, and a stopper part that forms a gap between the guide flow path and the valve body in the first state.

Using this type of configuration makes it possible to supply the cooling medium at the first flow rate to the downstream of the valve body with a high degree of accuracy because the stopper part forms a gap between a strut cover guide part and the valve body.

The gas turbine according to a sixth aspect of the present invention is the gas turbine of any one of the second through the fifth aspects, wherein the valve part may have a drive part for moving the valve body, and may be provided with a failsafe part for making a flow rate of the cooling medium circulating through the guide flow path the second flow rate when the drive part cannot be controlled.

Using this type of configuration makes it possible to forcibly make the flow rate of the cooling medium circulating through the guide flow path the second flow rate when the switching part is unable to switch from the first state to the second state. Therefore, it is possible to prevent a situation where the cooling medium flow rate is inadequate and thus the cooling medium is unable to sufficiently cool the structure in a case where the structure must be cooled more than during the rated operation. Accordingly, it is possible to prevent the temperature of the structure from rising too high and thus damaging the structure in a case where the structure must be cooled more than during the rated operation.

The gas turbine according to a seventh aspect of the present invention is the gas turbine of any one of the first through the sixth aspects, wherein the exhaust diffuser may be provided with a tubular outer diffuser forming a portion of the exhaust flow path, an inner diffuser provided inside the outer diffuser and defining the exhaust flow path together with the outer diffuser, and a strut cover for linking the outer diffuser and the inner diffuser; and the guide part may have a strut cover guide part for guiding the cooling medium to the strut cover as the structure, and an outer diffuser guide part for guiding the cooling medium to the outer diffuser as the structure.

Using this type of configuration makes it possible to use the cooling medium to simultaneously cool a plurality of structures, namely the strut cover and the outer diffuser. Accordingly, this type of configuration also makes it possible to use the cooling medium efficiently.

The gas turbine according to an eighth aspect of the present invention is the gas turbine of the seventh aspect, wherein the guide part may have a flow rate adjusting part for adjusting the flow rate of the cooling medium being guided to at least one out of the strut cover guide part and the outer diffuser guide part.

Using this type of configuration makes it possible to adjust the flow rate of the cooling medium circulating through the strut cover guide part and the outer diffuser guide part using the flow rate adjusting part. Therefore, it becomes possible to divide the cooling medium taken in as a whole into different flow rates and to circulate the cooling medium at said rates to the strut cover guide part and the outer diffuser guide part, respectively, without controlling the medium in a precise manner. Accordingly, the strut cover and the outer diffuser can be cooled effectively by using the cooling medium more efficiently.

The gas turbine according to a ninth aspect of the present invention is the gas turbine of any one of the first through the eighth aspects, wherein the switching part may switch between the first state and the second state based on a gas turbine output or a correlation value that is a value correlating to the gas turbine output.

Using this type of configuration makes it possible to switch between the first state and the second state so as to correspond, in a highly accurate manner, to the time when an operating state has been switched from the rated operation. Accordingly, it is possible to prevent the switching part from erroneously switching to the first state during any other time than the rated operation. Therefore, it is possible to prevent a case where the flow rate of the cooling medium is so insufficient that the structure cannot be adequately cooled during times other than the rated operation. Accordingly, it is possible to prevent the temperature of the structure from rising too high and thus damaging the structure during times other than the rated operation.

A gas turbine operating method according to a tenth aspect of the present invention is an operating method for a gas turbine provided with an exhaust diffuser in which an exhaust flow path for circulating exhaust gas from a turbine is formed, and a cooling device for cooling a structure facing the exhaust flow path in the exhaust diffuser by supplying a cooling medium to the structure. The operating method includes a first step of making a flow rate of the cooling medium being supplied to the structure during a rated operation a first flow rate, and a second step of making a flow rate of the cooling medium being supplied to the structure during a turn-down operation a second flow rate higher than the first flow rate.

This configuration involves executing the first step during the rated operation and the second step during the turn-down operation. Therefore, it is possible to supply the cooling medium at a second flow path higher than the first flow rate by switching from the first state to the second state during the turn-down operation. Accordingly, by switching the switching part from the first state to the second state during the turn-down operation, more of the cooling medium can be supplied to the structure than is supplied during the rated operation. Thus, the efficiency of cooling a structure exposed to exhaust gas can be raised during the turn-down operation above said efficiency during the rated operation. Furthermore, during the turn-down operation, the switching part can switch from the first state during the rated operation to the second state. Therefore, a cooling medium at a flow rate required during the turn-down operation can be prevented from flowing during the rated operation. Therefore, it is possible to prevent an over-cooled state that would lower the efficiency of the gas turbine during the rated operation. Based on these facts, a gas turbine can be operated efficiently, without having an impact during the rated operation, by temporarily enhancing a cooling effect.

Effect of the Invention

According to the present invention, the switching part can switch a flow rate of a cooling medium supplied to a structure between a first flow rate and a second flow rate higher than the first flow rate. Therefore, a cooling effect on the structure in the exhaust gas can be enhanced temporarily without having an impact during a rated operation.

DESCRIPTION OF THE PREFERRED EMBODIMENTS

First Embodiment

A first embodiment according to the present invention is described below with reference to FIG. 1 through FIG. 3.

Figure 1:
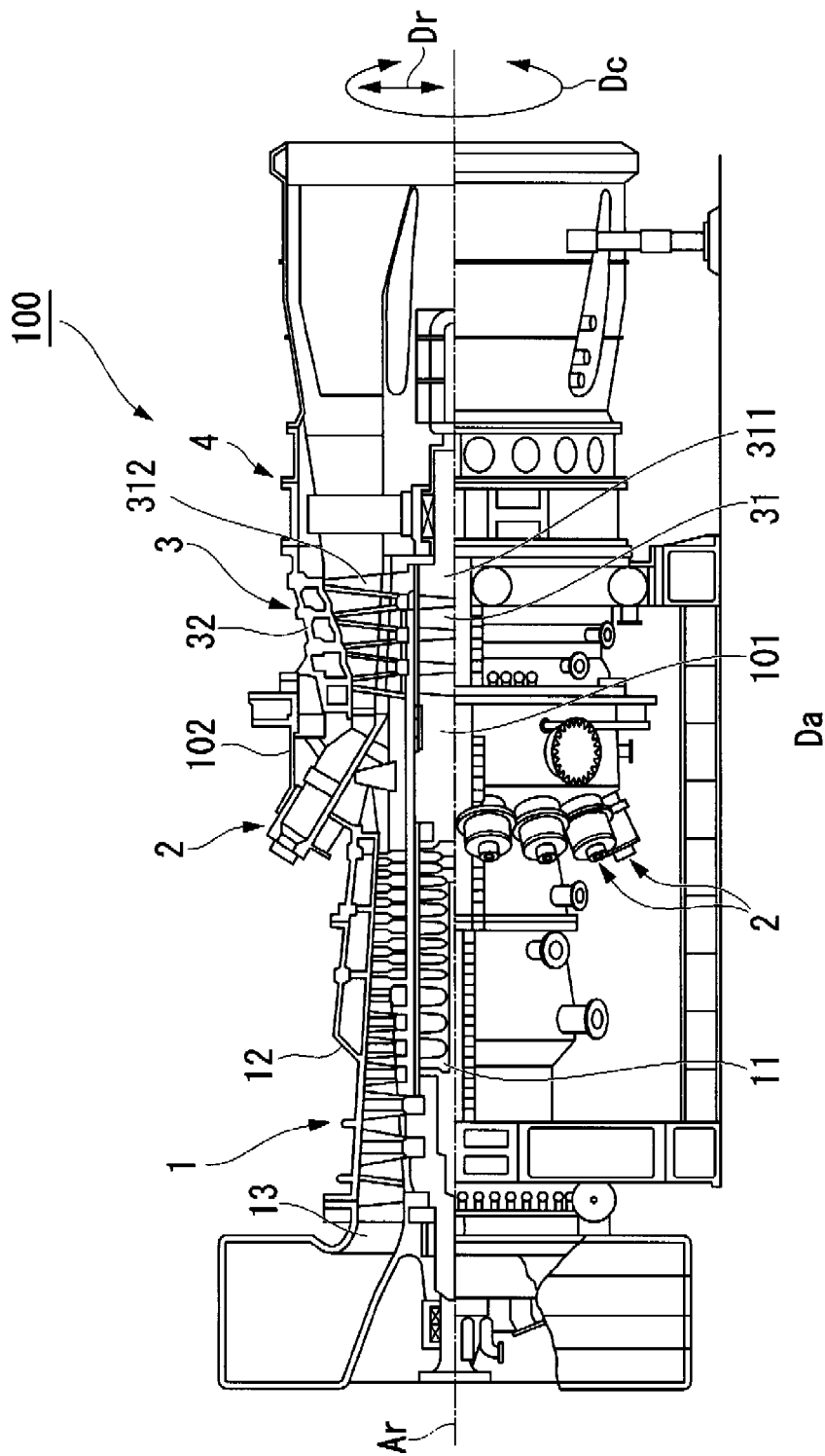
FIG. 1 is a cutaway side view of a main portion of a gas turbine according to a first embodiment of the present invention.

As illustrated in FIG. 1, a gas turbine 100 according to the present embodiment is provided with a compressor 1, a plurality of combustors 2, a turbine 3, and an exhaust chamber part 4. The compressor 1 compresses outside air to generate compressed air. The combustor 2 burns fuel in the compressed air to generate combustion gas. The turbine 3 is driven by the combustion gas. The exhaust chamber part 4 circulates exhaust gas from the turbine 3.

The compressor 1 has a compressor rotor 11, a compressor casing 12, and an Inlet Guide Vane (IGV) 13. The compressor rotor 11 rotates centered on an axial line Ar. The compressor casing 12 rotatably covers the compressor rotor 11. The IGV 13 is provided in an intake port in the compressor casing 12. The IGV 13 adjusts a flow rate of air taken into the compressor casing 12.

Note that a direction in which the axial line Ar extends is referred to hereinafter as axial direction Da. A circumferential direction Dc centered on the axial line Ar is referred to simply as circumferential direction Dc. A vertical direction with respect to the axial line Ar is referred to as radial direction Dr. Furthermore, a first side in the axial direction Da is referred to as an upstream side (one side), and a second side in the axial direction Da is referred to as a downstream side (another side). Furthermore, a side close to the axial line Ar in the radial direction Dr is referred to as an inside in the radial direction Dr, while a side in the radial direction Dr opposite the inside in the radial direction Dr is referred to as an outside in the radial direction Dr.

The turbine 3 has a turbine rotor 31 that rotates centered on the axial line Ar and a turbine casing 32 that rotatably covers the turbine rotor 31. The axial line Ar of the compressor rotor 11 and the axial line Ar of the turbine rotor 31 are positioned on the same straight line. The compressor rotor 11 and the turbine rotor 31 are linked together to form a gas turbine rotor 101. For example, a rotor of a generator not illustrated in the figure is connected to the gas turbine rotor 101. Furthermore, the compressor casing 12 and the turbine casing 32 are linked together to form a gas turbine casing 102.

Figure 2:
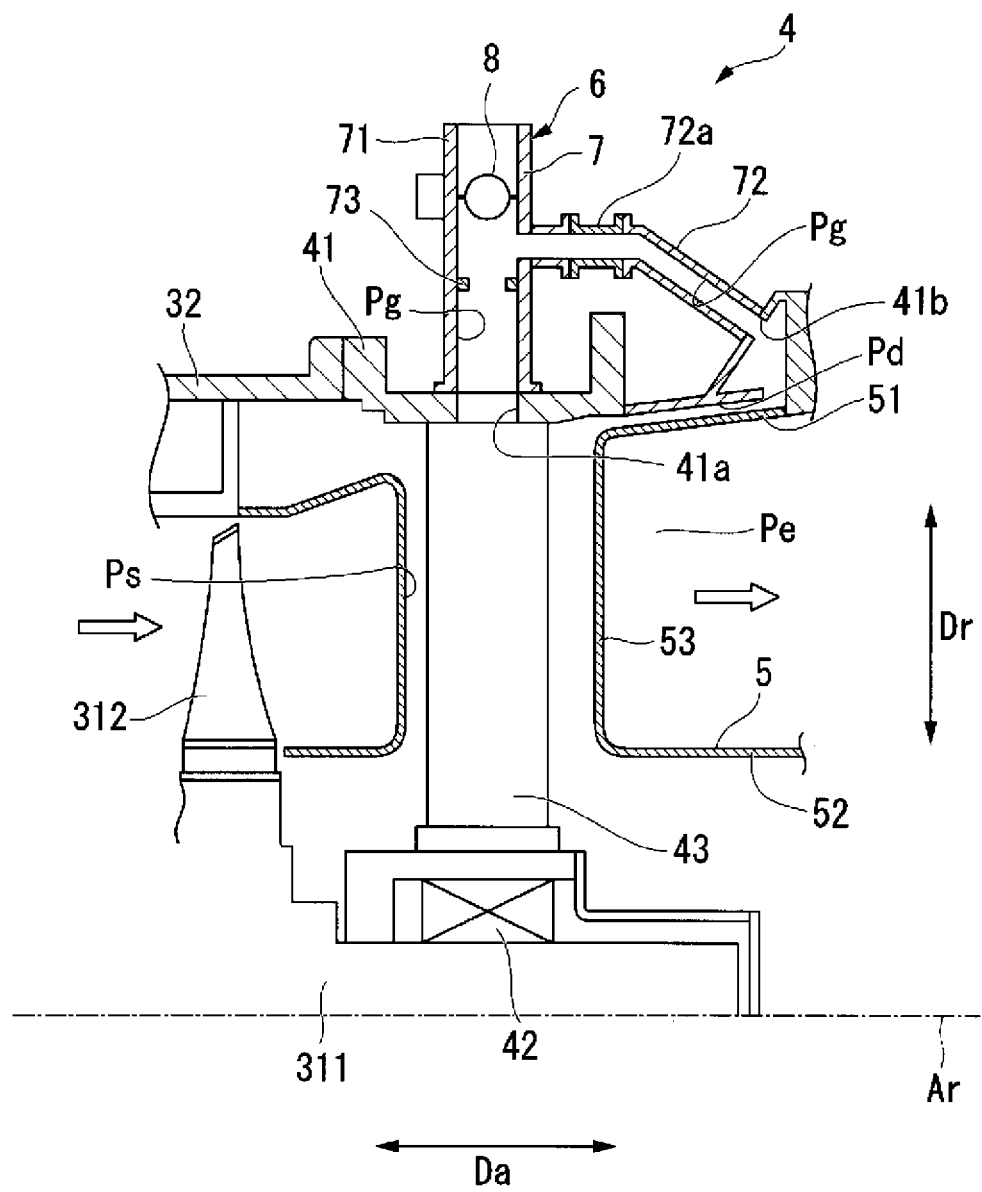
FIG. 2 is a cross sectional view of the main portion of the gas turbine illustrating an exhaust chamber part according to the first embodiment of the present invention.
Figure 3:
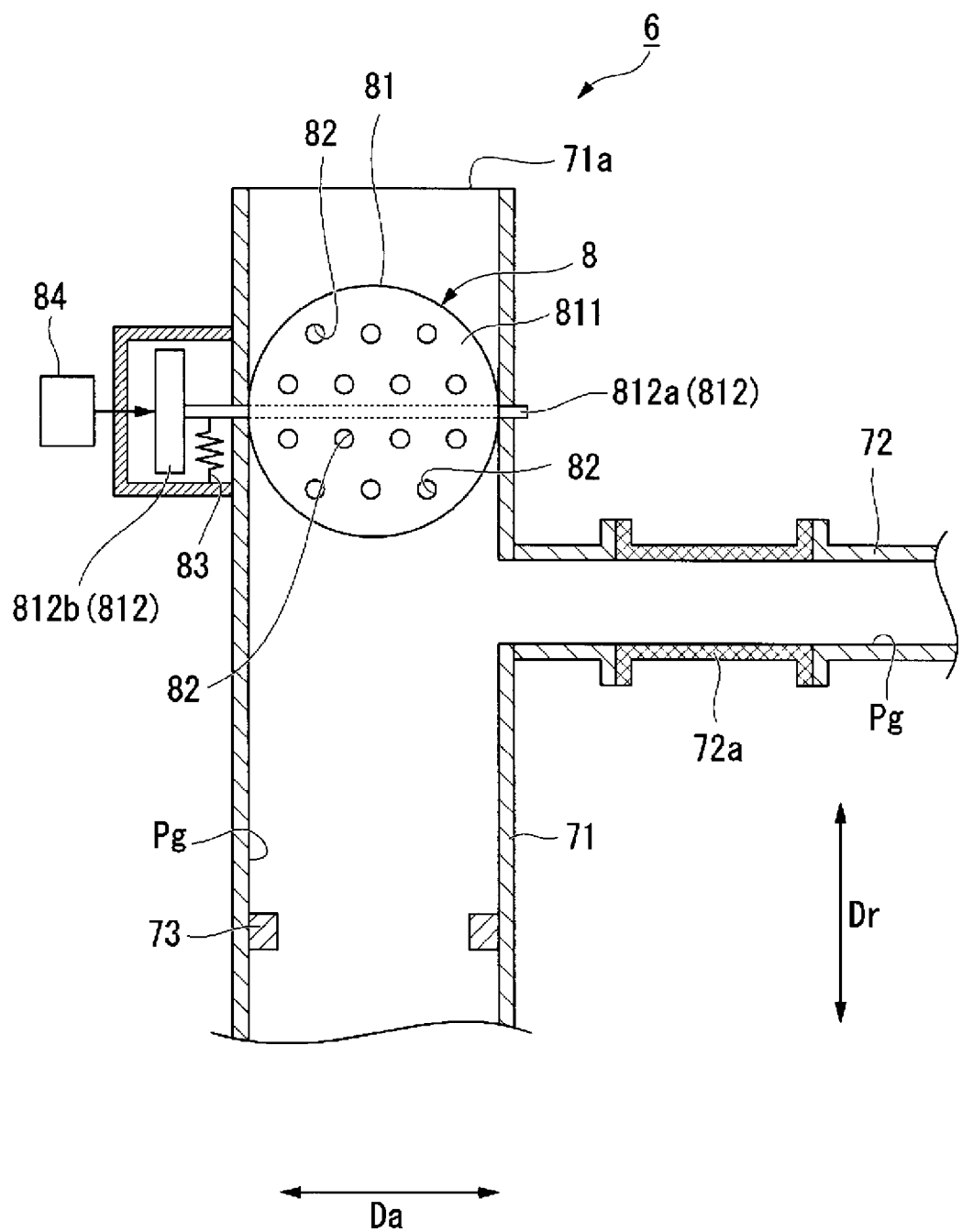
FIG. 3 is a cross sectional view of a main portion for describing a cooling device according to the first embodiment of the present invention.

As illustrated in FIG. 2, the turbine rotor 31 has a rotor shaft 311 extending in the axial direction Da centered on the axial line Ar, and a plurality of blades 312 attached to the rotor shaft 311. A vane is provided on the upstream side of each of the blades 312.

The plurality of combustors 2 are aligned in the circumferential direction Dc centered on the axial line Ar and are housed in the gas turbine casing 102. The combustor 2 is secured to the gas turbine casing 102.

Exhaust gas emitted from the turbine 3 flows through the exhaust chamber part 4. As illustrated in FIG. 2, the exhaust chamber part 4 is provided with an exhaust chamber wall 41, a bearing part 42, a strut 43, an exhaust diffuser 5, and a cooling device 6.

The exhaust chamber wall 41 forms part of the gas turbine casing 102. The exhaust chamber wall 41 is provided on the downstream side of the turbine casing 32. The exhaust chamber wall 41 forms a cylindrical shape centered on the axial line Ar. The exhaust chamber wall 41 is provided on the downstream side from a final stage of the blades 312.

The bearing part 42 rotatably supports the turbine rotor 31. The bearing part 42 is provided on the inside in the radial direction Dr of an inner diffuser 52 described later.

The strut 43 links the exhaust chamber wall 41 and the bearing part 42. The strut 43 is provided so as to penetrate the exhaust diffuser 5. The strut 43 extends in a tangential direction of the turbine rotor 31 so as to incline at a predetermined angle in the circumferential direction Dc with respect to the radial direction Dr. A plurality of the struts 43 are provided evenly spaced in the circumferential direction Dc.

The exhaust diffuser 5 forms an exhaust flow path Pe for circulating the exhaust gas from the turbine 3. The exhaust diffuser 5 is provided with an outer diffuser 51, the inner diffuser 52, and a strut cover 53.

The outer diffuser 51 and the inner diffuser 52 are provided on the inside in the radial direction Dr of the exhaust chamber wall 41. The outer diffuser 51 and the inner diffuser 52 form cylindrical shapes centered on the axial line Ar. The strut 43 penetrates the outer diffuser 51 and the inner diffuser 52.

The outer diffuser 51 is provided so as to leave a gap on the inside in the radial direction Dr of the exhaust chamber wall 41. The outer diffuser 51 extends along an inner circumferential surface of the exhaust chamber wall 41. The inner diffuser 52 is provided so as to leave a gap on the inside in the radial direction Dr of the outer diffuser 51. The outer diffuser 51 and the inner diffuser 52 form the exhaust flow path Pe for combustion gas that has rotated the turbine rotor 31 in a space between the diffusers in the radial direction Dr. In other words, the exhaust flow path Pe extends in the axial direction Da, in the space between the outer diffuser 51 and the inner diffuser 52 in the radial direction Dr. An outer diffuser flow path Pd is defined in a space between the outer diffuser 51 and the exhaust chamber wall 41 in the radial direction Dr.

The outer diffuser flow path Pd cools the outer diffuser 51 by circulating a cooling medium along an outer circumferential surface of the outer diffuser 51. The outer diffuser flow path Pd extends in the axial direction Da along the outer circumferential surface of the outer diffuser 51 on the outside in the radial direction Dr of the outer diffuser 51. The outer diffuser flow path Pd is connected to a strut flow path Ps described below on the upstream side in the axial direction Da. The outer diffuser flow path Pd is connected to the cooling device 6 on the downstream in the axial direction Da.

The strut cover 53 forms a cylindrical hollow structure. The strut 43 is provided inside the strut cover 53. In other words, the strut cover 53 covers the strut 43 along the direction in which the strut extends. A space between the strut cover 53 and the strut 43 is formed as the strut flow path Ps. The strut flow path Ps cools the strut cover 53 and the strut 43 by circulating the cooling medium. The strut flow path Ps is formed so as to have a larger flow path cross section than the outer diffuser flow path Pd.

The strut cover 53 has an end thereof on the outside in the radial direction Dr attached to the outer diffuser 51. The strut cover 53 has an end thereof on the inside in the radial direction Dr attached to the inner diffuser 52. The strut cover 53 is provided inside the exhaust flow path Pe so as to traverse the exhaust flow path Pe.

The cooling device 6 cools a structure facing the exhaust flow path Pe in the exhaust diffuser 5. In the present embodiment, the structure in the exhaust gas means the outer diffuser 51 and the strut cover 53. As the cooling medium, the cooling device 6 supplies outside air under atmospheric pressure from outside the gas turbine 100 to the structure as cooling air. The cooling device 6 according to the present embodiment supplies the cooling medium to the structure. The cooling device 6 is attached to the exhaust chamber wall 41. The cooling device 6 has a guide part 7 and a switching part 8.

A guide flow path Pg for circulating the cooling medium is formed inside the guide part 7. The guide part 7 guides the cooling air drawn in from outside to the structure as the cooling medium. Specifically, the guide part 7 has a strut cover guide part 71, an outer diffuser guide part 72, and a flow rate adjusting part 73.

The strut cover guide part 71 guides the cooling medium to the strut cover 53 as the structure. The strut cover guide part 71 guides the cooling air to the strut flow path Ps through a first cooling medium supply hole 41a formed in the exhaust chamber wall 41. The first cooling medium supply hole 41a is formed at a position in the exhaust chamber wall 41 corresponding to the strut 43 in the axial direction Da. The strut cover guide part 71 has an opening 71a for receiving outside air as the cooling medium. The strut cover guide part 71 according to the present embodiment is a pipe forming a cylindrical shape extending toward the outside in the radial direction Dr from the exhaust chamber wall 41. In other words, a space inside the strut cover guide part 71 forms part of the guide flow path Pg connected to the strut flow path Ps. The outside of the strut cover guide part 71 in the radial direction Dr, which is the side opposite the side connected to the first cooling medium supply hole 41a, constitutes an opening 71a that opens so as to connect to the outside of the gas turbine casing 102.

The outer diffuser guide part 72 guides the cooling medium to the outer diffuser 51 as the structure. The outer diffuser guide part 72 guides the cooling air to the outer diffuser flow path Pd through a second cooling medium supply hole 41b formed in the exhaust chamber wall 41. The second cooling medium supply hole 41b is formed in the exhaust chamber wall 41 further on the downstream side in the axial direction Da than the first cooling medium supply hole 41a. The outer diffuser guide part 72 according to the present embodiment is a pipe forming a cylindrical shape branching off and extending toward the downstream side in the axial direction Da from a midpoint in the radial direction Dr of the strut cover guide part 71. In other words, a space inside the outer diffuser guide part 72 forms part of the guide flow path Pg connected to the outer diffuser flow path Pd.

The outer diffuser guide part 72 has a flexible area 72a with high flexibility that is a part thereof in the axial direction Da and configured using a flexible material. The position of the outer diffuser guide part 72 is adjusted by the flexible area 72a so as to follow a positional shift between the strut cover guide part 71 and the second cooling medium supply hole 41b.

The flow rate adjusting part 73 adjusts the flow rate of the cooling medium guided to at least one out of the strut cover guide part 71 and the outer diffuser guide part 72. The flow rate adjusting part 73 according to the present embodiment adjusts the flow rate of the cooling medium guided to the strut cover guide part 71. The flow rate adjusting part 73 is provided farther toward the exhaust chamber wall 41 than the position where the outer diffuser guide part 72 branches from the strut cover guide part 71. The flow rate adjusting part 73 is an orifice forming a ring shape and secured to an inner circumferential surface of the strut cover guide part 71.

The switching part 8 is made to be able to switch between a first state where the flow rate of the cooling medium circulating through the guide flow path Pg is a first flow rate corresponding to that during the rated operation and a second state where the flow rate of the cooling medium is a second flow rate higher than the first flow rate. The switching part 8 switches an inflow state of the cooling air to the guide part 7 from the outside. The switching part 8 switches between the first state and the second state based on a gas turbine output or a correlation value that is a value correlating to the gas turbine output. The switching part 8 according to the present embodiment has a valve part 81, a supply part 82, a failsafe part 83, and a control part 84.

The valve part 81 is provided in the guide part 7, close to the opening 71a through which the cooling air is taken in from the outside. The valve part 81 according to the present embodiment is provided on the opening 71a side, which is farther on the upstream side than the position where the outer diffuser guide part 72 branches from the strut cover guide part 71. The valve part 81 according to the present embodiment is a butterfly valve. The valve part 81 has a valve body 811 and a drive part 812.

The valve body 811 moves so as to narrow the flow path area of the guide flow path Pg in the first state and to widen the flow path area in the second state. The valve body 811 has a round plate-like shape. The outer shape of the valve body 811 conforms to the shape of the inner circumferential surface of the strut cover guide part 71. The valve body 811 is rotated by the drive part 812 described below to open and block the guide flow path Pg. By blocking the guide flow path Pg, the valve body 811 sets the switching part 8 to the first state where the cooling air flows into the guide flow path Pg only from the supply part 82 described below. By opening the guide flow path Pg, the valve body 811 sets the switching part 8 to the second state where the cooling air flows into the guide flow path Pg at the second flow rate higher than the first flow rate.

The drive part 812 switches the valve body 811 between the first state and the second state by moving the valve body 811. The drive part 812 has a valve shaft part 812*a* and a drive part main body 812*b*.

The valve shaft part 812*a* is provided so as to pass through a center of the valve body 811. The valve shaft part 812*a* forms a cylindrical shape and is made to be rotatable together with the valve body 811 around a central axis thereof. The valve shaft part 812*a* is provided in a state penetrating the strut cover guide part 71 in a direction perpendicular to the direction in which the strut cover guide part extends.

The drive part main body 812*b* rotates the valve shaft part 812*a* together with the valve body 811. The drive part main body 812*b* according to the present embodiment is provided on an outer circumferential surface of the guide part 7. The drive part main body 812*b* is configured from, for example, an air cylinder. The drive part main body 812*b* rotates the valve shaft part 812*a* by pressing an end part of the valve shaft part 812*a* at a position eccentric from the central axis of the valve shaft part 812*a*. The drive part main body 812*b* sets the switching part 8 to the first state by rotating the valve shaft part 812*a* to block the guide flow path Pg using the valve body 811. The drive part main body 812*b* sets the switching part 8 to the second state by rotating the valve shaft part 812*a* to open the guide flow path Pg using the valve body 811.

In the state where the valve body 811 has blocked the guide flow path Pg, the supply part 82 supplies the cooling medium to the structure in the exhaust gas at the first flow rate. The supply part 82 according to the present embodiment is a plurality of round through holes formed in the valve body 811. Only a number of the supply parts 82 corresponding to the flow path area needed to circulate the cooling medium at the first flow rate are formed.

Note that the supply part 82 according to the first embodiment is not limited to being a plurality of through holes. The supply part 82 may be one through hole so long as the flow path area needed to circulate the cooling medium at the first flow rate can be ensured. The supply part 82 may be formed in an end part of the valve body 811 or in a center part of the valve body 811.

When the switching part 8 is unable to switch from the first state to the second state, the failsafe part 83 sets the flow rate of the cooling medium circulating through the guide flow path Pg to the second flow rate. The failsafe part 83 according to the present embodiment forcefully rotates the valve body 811 to open the guide flow path Pg when the drive part 812 cannot be controlled such that the valve body 811 cannot be rotated by the drive part main body 812*b* and the guide flow path Pg is left in a blocked state. Specifically, the failsafe part 83 is, for example, an elastic member, such as a spring material. The failsafe part 83 pushes the valve shaft part 812*a* in a direction in which the valve body 811 opens.

The control part 84 drives the valve body 811 so as to switch between the first state and the second state based on a gas turbine output or a correlation value that is a value correlating to the gas turbine output. The control part 84 according to the present embodiment switches a drive state of the drive part 812 based on the gas turbine output measured using an output gauge not illustrated in the figures. The control part 84 sends a signal to the drive part 812 to block the guide flow path Pg using the valve body 811 so as to narrow the flow path area of the guide flow path Pg during the rated operation of the gas turbine 100. The control part 84 sends a signal to the drive part 812 to open the guide flow path Pg using the valve body 811 so as to widen the flow path area of the guide flow path Pg during a turn-down operation of the gas turbine 100.

Note that during the turn-down operation (either partial load operation or low load operation) the gas turbine 100 operates in a state where the gas turbine output is below that during the rated operation. The turn-down operation includes a method for maintaining a high turbine inlet temperature simply by reducing the degree of opening of the IGV 13, a method for reducing the flow rate of combustion gas passing through the turbine 3 using an anti-icing system, and a method for reducing the flow rate of combustion gas passing through the turbine 3 using a turbine bypass system.

With the turn-down operation using the anti-icing system, an intake air temperature is raised and the compressor 1 is kept from freezing by returning air extracted from the compressor 1 to an intake side. Therefore, the intake air temperature of the compressor 1 can be raised even if the intake air temperature is not low. Thus, in addition to reducing a mass flow rate of air taken into the compressor 1, an amount of combustion air can be further reduced using the extracted air. As a result, the gas turbine 100 can be operated after reducing the flow rate of the combustion gas passing through the turbine 3 and lowering the gas turbine output.

With the turn-down operation using the turbine bypass system, a portion of discharge air from the compressor 1 is extracted and bypassed to an exhaust side of the turbine 3. Thus, the gas turbine 100 can be operated after reducing the flow rate of the combustion gas passing through the turbine 3 and lowering the gas turbine output.

According to the operating method of the gas turbine 100 of the first embodiment, during the rated operation a first step is executed in which the flow rate of the cooling medium supplied to the structure in the exhaust gas is set to the first flow rate. In the first step, a signal is sent from the control part 84 to the drive part 812 so that the valve body 811 blocks the guide flow path Pg based on a measured gas turbine output. The drive part main body 812*b* of the drive part 812 that has received the signal rotates the valve body 811 together with the valve shaft part 812*a* so as to block the guide flow path Pg. Because the guide flow path Pg is blocked by the valve body 811, the cooling air flows into the guide flow path Pg only from the through holes that are the supply part 82. In other words, the switching part 8 is switched to the first state. Therefore, the cooling air flows into the guide flow path Pg of the strut cover guide part 71 only at the first flow rate. As the cooling air that has flowed in flows through the strut cover guide part 71 toward the first cooling medium supply hole 41*a*, a portion thereof flows into the outer diffuser guide part 72 toward the second cooling medium supply hole 41*b*.

The cooling air that has flowed inside the exhaust chamber wall 41 from the first cooling medium supply hole 41*a* circulates through the strut flow path Ps to thus cool the strut cover 53 and the strut 43. The cooling air that has passed through the strut flow path Ps passes on the inside in the radial direction Dr of the inner diffuser 52, and then, flows into the exhaust flow path Pe between the inner diffuser 52 and the outer diffuser 51 from between the final stage of the blades 312 and an upstream end of the inner diffuser 52.

Furthermore, the cooling air that has flowed inside the exhaust chamber wall 41 from the second cooling medium supply hole 41*b* circulates through the outer diffuser flow path Pd to thus cool the outer diffuser 51. The cooling air that has passed through the outer diffuser flow path Pd merges with the cooling air that is circulating through the strut flow path Ps.

When the operating state of the gas turbine 100 changes to the turn-down operation, a second step is executed in which the flow rate of the cooling medium supplied to the structure is set to the second flow rate higher than the first flow rate. In the second step, a signal is sent from the control part 84 to the drive part 812 so that the valve body 811 opens the guide flow path Pg based on a measured gas turbine output. The drive part main body 812b of the drive part 812 that has received the signal rotates the valve body 811 together with the valve shaft part 812a so as to open the guide flow path Pg. Because the guide flow path Pg is opened by the valve body 811, a large amount of the cooling air flows into the guide flow path Pg. In other words, the switching part 8 is switched to the second state. Therefore, the cooling air flows into the guide flow path Pg of the strut cover guide part 71 at the second flow rate higher than the first flow rate. Just as during the rated operation, as the cooling air that has flowed in flows through the strut cover guide part 71 toward the first cooling medium supply hole 41a, a portion thereof flows into the outer diffuser guide part 72 toward the second cooling medium supply hole 41b.

According to the gas turbine 100 described above, switching can be done such that the switching part 8 is set to the first state by executing the first step during the rated operation, and such that the switching part 8 is set to the second state by executing the second step during the turn-down operation. In other words, by switching from the first state to the second state, the cooling medium at the second flow path, which is higher than the first flow rate during the rated operation, can be supplied to the strut flow path Ps and the outer diffuser flow path Pd. An expansion ratio of the turbine 3 becomes smaller during the turn-down operation because the flow rate of combustion gas passing through the turbine 3 decreases. Therefore, during the turn-down operation, the temperature of the exhaust gas rises compared to said temperature during the rated operation because the combustion temperature is kept high. However, the structures exposed to the exhaust gas, such as the strut cover 53, the outer diffuser 51, and the inner diffuser 52, can be cooled during the turn-down operation by an amount of the cooling air that is larger than during the rated operation. Thus, a cooling effect on the structures in the exhaust gas, such as the strut cover 53, the outer diffuser 51, and the inner diffuser 52, can be raised during the turn-down operation above said effect during the rated operation.

Furthermore, the switching part 8 can be switched during the turn-down operation so that the state goes from the first state during the rated operation to the second state, which thus makes it possible to prevent the cooling air at a flow rate needed during the turn-down operation from also flowing during the rated operation. Therefore, it is possible to prevent an over-cooled state that would lower the efficiency of the gas turbine 100 during the rated operation.

Based on the above, the cooling effect can be raised during the turn-down operation without having an impact during the rated operation. In other words, the cooling effect on structures exposed to the exhaust gas, such as the strut cover 53, the outer diffuser 51, and the inner diffuser 52, can be temporarily raised as needed without having an impact during the rated operation. Accordingly, the gas turbine 100 can be operated efficiently.

Furthermore, the flow path area of the guide flow path Pg for circulating the cooling air can be changed easily because the switching part 8 has the valve body 811. Accordingly, the flow rate of cooling air flowing through the guide flow path Pg can be switched using a simple configuration. Furthermore, the cooling medium at the first flow rate can be supplied to the structure with a high degree of accuracy during the rated operation because the cooling medium at the first flow rate is supplied to the downstream of the valve body 811 from the through holes formed in the valve body 811 in a state where the valve body 811 has blocked the guide flow path Pg. Accordingly, the needed cooling medium can be stably secured during the rated operation.

Furthermore, the cooling air can be supplied to the downstream of the valve body 811 at the first flow rate with a high degree of accuracy because the supply part 82 is through holes formed in the valve body 811. Furthermore, the supply part 82 can be formed using the simple structure of simply forming through holes in the valve body 811.

Furthermore, the failsafe part 83 causes the valve shaft part 812a to push the valve body 811 in an opening direction. As a result, a state where the valve body 811 keeps blocking the guide flow path Pg can be prevented, even when the drive part 812 fails and can thus no longer rotate the valve body 811. Therefore, a condition where the guide flow path Pg is blocked by the valve body 811 and the cooling air is supplied to the structures, such as the strut cover 53, the outer diffuser 51, and the inner diffuser 52, at just the first flow rate during the turn-down operation can be prevented. In other words, it is possible to prevent a situation where the cooling air flow rate is inadequate and thus the cooling air is unable to sufficiently cool the structure exposed to the exhaust gas that must be cooled during the turn-down operation more than during the rated operation. Accordingly, it is possible to prevent the temperatures of the strut cover 53, the outer diffuser 51, the inner diffuser 52, and the like, from rising too high during the turd-down operation and thus damaging said structures.

Furthermore, the guide part 7 has the strut cover guide part 71 that connects to the strut flow path Ps, and the outer diffuser guide part 72 that connects to the outer diffuser flow path Pd. Therefore, it is possible to use the cooling air to simultaneously cool a plurality of structures, namely the strut cover 53 and the outer diffuser 51. Accordingly, this type of configuration also makes it possible to use the cooling air efficiently.

Furthermore, the flow rate of the cooling air circulating through the strut cover guide part 71 and the outer diffuser guide part 72 can be adjusted by the orifice that is the flow rate adjusting part 73. Therefore, it becomes possible to divide the cooling air taken in as a whole from outside through the valve part 81 into different flow rates and to circulate the cooling air at said rates to the strut cover guide part 71 and the outer diffuser guide part 72, respectively, without controlling the air in a precise manner. Accordingly, the strut cover 53 and the outer diffuser 51 can be cooled effectively by using the cooling air more efficiently.

The control part 84 switches the drive state of the drive part 812 based on the gas turbine output. Therefore, it is possible to switch between the first state and the second state so as to correspond, in a highly accurate manner, to the time when an operating state has been switched so as to switch between the rated operation and the turn-down operation. Accordingly, it is possible to prevent the switching part 8 from erroneously switching to the first state during any other time than the rated operation, such as during the turn-down operation. Therefore, it is possible to prevent a case where the flow rate of the cooling air is so insufficient that the structure cannot be adequately cooled during the turn-down operation. Accordingly, it is possible to prevent the temperatures of the strut cover 53, the outer diffuser 51, the inner diffuser 52, and the like, from rising too high during the turn-down operation and thus damaging said structures.

Furthermore, the outer diffuser guide part 72 has a flexible area 72a with high flexibility that is a part thereof and configured using a flexible material. Therefore, it is possible, when the outer diffuser guide part 72 and the exhaust chamber wall 41, in which the second cooling medium supply hole 41b is formed, displace positionally, to suppress the influence of any positional displacement between the strut cover guide part 71 and the second cooling medium supply hole 41b caused by thermal elongation of the exhaust casing in the axial direction Da occurring during operation of the gas turbine 100. Accordingly, it is possible to prevent the cooling device 6 from falling from the exhaust chamber wall 41 even when the guide part 7 is connected to the exhaust chamber wall 41 in a plurality of locations, such as the first cooling medium supply hole 41a and the second cooling medium supply hole 41b, as in the present embodiment.

Second Embodiment

Figure 4:
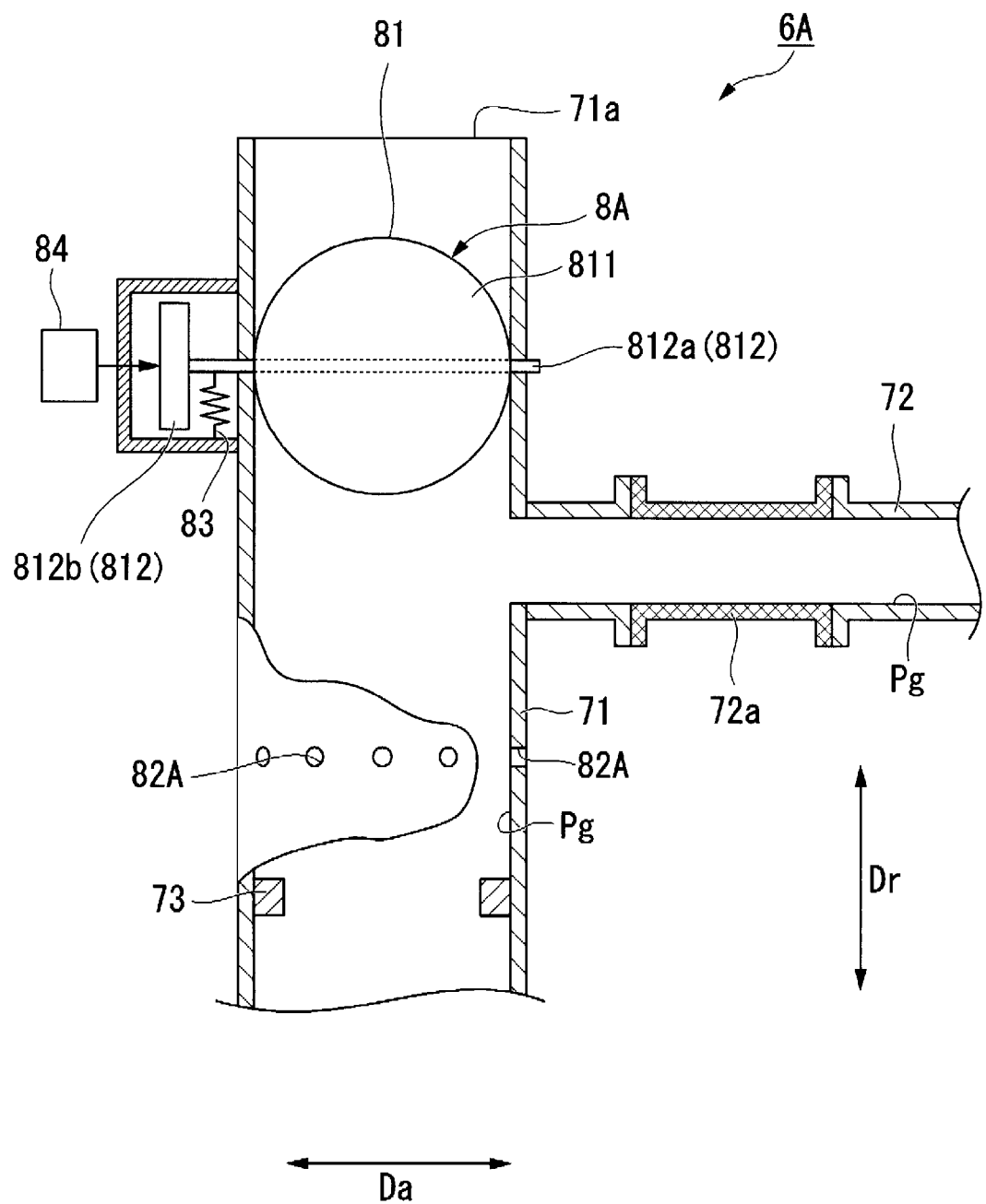
FIG. 4 is a cross sectional view of a main portion for describing a cooling device according to a second embodiment of the present invention.

A second embodiment of the gas turbine will be described next with reference to FIG. 4.

The same reference symbols are attached to constituent elements in the second embodiment that are the same as those in the first embodiment, and detailed descriptions thereof are omitted. With the gas turbine according to the second embodiment, the supply part of the switching part of the cooling device is configured differently than in the first embodiment.

With a cooling device 6A according to the second embodiment, a supply part 82A of a switching part 8A is linking holes formed in the guide part 7 so as to link the outside of the exhaust diffuser 5 and the guide flow path Pg farther on the exhaust chamber wall 41 side than the valve body 811. The supply part 82A according to the second embodiment is a plurality of round holes penetrating the strut cover guide part 71, which is a pipe, in a direction perpendicular to the direction in which the strut cover guide part extends. The supply part 82A is formed between the flow rate adjusting part 73 and the position where the outer diffuser guide part 72 branches from the strut cover guide part 71.

Note that the supply part 82A according to the second embodiment is not limited to being a plurality of linking holes. The supply part 82A may be one linking hole so long as the flow path area needed to circulate the cooling medium at the first flow rate can be ensured. Furthermore, the supply part 82A can be formed in the strut cover guide part 71 at any position on the exhaust chamber wall 41 side farther downstream than the valve body 811.

According to the gas turbine 100 of the second embodiment, the supply part 82A is formed so as to link the outside and the inside of the strut cover guide part 71. Therefore, it is possible to supply the cooling air at the first flow rate from outside to the downstream of the valve body 811 with a high degree of accuracy even when the valve body 811 has blocked the guide flow path Pg. Furthermore, it is possible to form a structure able to supply the cooling air at the first flow rate without involving the valve body 811 because the supply part 82A is formed in the strut cover guide part 71.

Third Embodiment

Figure 5:
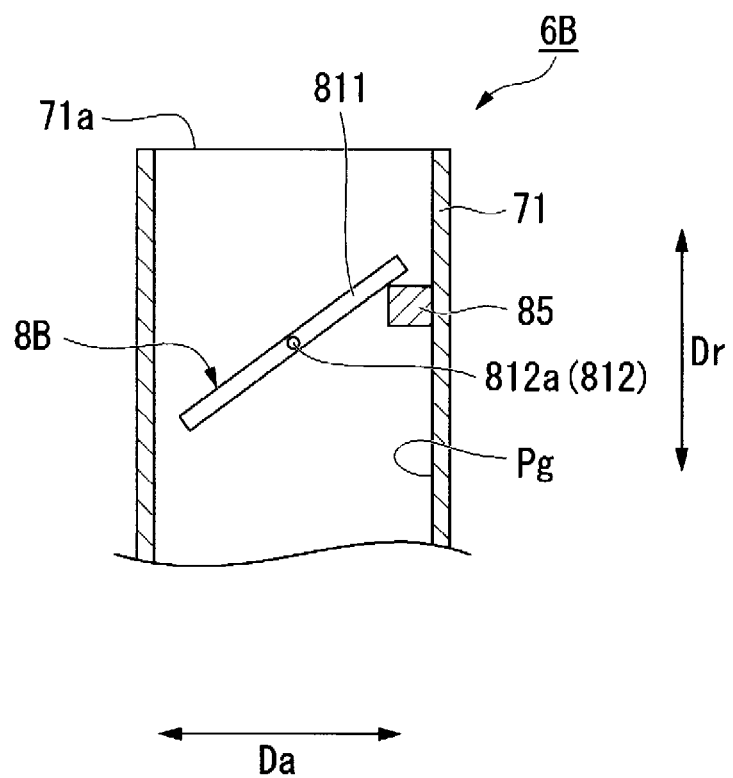
FIG. 5 is a cross sectional view of a main portion for describing a cooling device according to a third embodiment of the present invention.

A third embodiment of the gas turbine will be described next with reference to FIG. 5.

The same reference symbols are attached to constituent elements in the third embodiment that are the same as those in the first and second embodiments, and detailed descriptions thereof are omitted. With the gas turbine according to the third embodiment, the switching part of the cooling device is configured differently than in the first and second embodiments.

With a cooling device 6B according to the third embodiment, a switching part 8B has a stopper part 85 instead of the supply part 82. The stopper part 85 forms a gap between the guide flow path Pg and the valve body 811 in the first state. The stopper part 85 forms a gap through which the cooling air circulates only at the first flow rate without the valve body 811 completely blocking the guide flow path Pg. The stopper part 85 according to the present embodiment protrudes inward from the inner circumferential surface of the strut cover guide part 71 so that the valve body 811 does not completely block the guide flow path Pg.

Note that as long as a gap through which the cooling air circulates only at the first flow rate can be created between the guide flow path Pg and the valve body 811, the stopper part 85 is not limited to the structure according to the present embodiment. For example, the stopper part 85 may protrude from the valve body 811 and may be structured so as to prevent the valve body 811 from blocking from the outside.

According to the gas turbine 100 of the third embodiment, the stopper part 85 forms a gap, through which the cooling air circulates only at the first flow rate, between the strut cover guide part 71 and the valve body 811. Therefore, it is possible to supply the cooling air at the first flow rate to the downstream of the valve body 811 with a high degree of accuracy.

While the embodiments of the present invention have been described above in detail with reference to the drawings, the constituent elements of each embodiment and the combinations thereof are merely examples, and additions, omissions, substitutions, and other changes may be made to these constituent elements without deviating from the spirit and scope of the present invention. The present invention is not to be considered as being limited by the foregoing embodiments, and is only limited by the scope of the appended claims.

Note that the structure in the present embodiment is not intended to be limited to being both the outer diffuser 51 and the strut cover 53. The structure may be any member that faces the exhaust flow path Pe and is exposed to the exhaust gas. For example, the structure may be either one out of the outer diffuser 51 and the strut cover 53. The structure may be a member other than the outer diffuser 51 and the strut cover 53, like the strut 43.

Furthermore, the switching part 8 is not limited to a structure having the valve part 81 and the supply part 82 as in the present embodiment. The switching part 8 may be any structure that is able to switch between the first state and the second state. For example, the switching part 8 may be a bypass structure such as one that supplies the cooling air through a pipe that differs between the first state and the second state.

Furthermore, the failsafe part 83 is not limited to a structure that presses the valve body 811 as in the present embodiment. The failsafe part 83 may have any structure that can set the flow rate of the cooling air circulating through the guide flow path Pg to the second flow rate when the switching part 8 is unable to switch from the first state to the second state. For example, the failsafe part 83 may be a bypass through which the cooling air is supplied so as to bypass the switching part 8 when the valve body 811 itself cannot move such that the switching part 8 cannot switch from the first state to the second state.

Furthermore, while a gas turbine output measured using an output gauge is used in the present embodiment, the embodiment is not limited thereto and may use any correlation value correlating to the gas turbine output that allows the state of the gas turbine output to be known. For example, temperature information obtained by measuring the temperature of the exhaust gas in the exhaust flow path Pe, or degree of opening information obtained by measuring the degree to which the IGV 13 is open, can also be used as the correlation value correlating to the gas turbine output.

INDUSTRIAL APPLICABILITY

In the gas turbine described above, the switching part can switch a flow rate of a cooling medium supplied to a structure between a first flow rate and a second flow rate higher than the first flow rate. Therefore, a cooling effect on the structure in the exhaust gas can be enhanced temporarily without having an impact during a rated operation.

REFERENCE NUMERALS

100 Gas turbine
1 Compressor
Ar Axial line
11 Compressor rotor
12 Compressor casing
13 IGV
Da Axial direction
Dc Circumferential direction
Dr Radial direction
2 Combustor
3 Turbine
31 Turbine rotor
311 Rotor shaft
312 Blade
32 Turbine casing
101 Gas turbine rotor
102 Gas turbine casing
4 Exhaust chamber part
41 Exhaust chamber wall
41*a* First cooling medium supply hole
41*b* Second cooling medium supply hole
42 Bearing part
43 Strut
5 Exhaust diffuser
51 Outer diffuser
Pd Outer diffuser flow path
52 Inner diffuser
53 Strut cover
Ps Strut flow path
Pe Exhaust flow path
6, 6A, 6B Cooling devices
7 Guide part
71 Strut cover guide part
72 Outer diffuser guide part
72*a* Flexible area
Pg Guide flow path
73 Flow rate adjusting part
8, 8A, 8B Switching parts
81 Valve part
811 Valve body
812 Drive part
812*a* Valve shaft part
812*b* Drive part main body
82, 82A Supply parts
83 Failsafe part
84 Control part
85 Stopper part

The invention claimed is:

1. A gas turbine comprising:
an exhaust diffuser in which an exhaust flow path for circulating exhaust gas from a turbine is formed; and
a cooling device for cooling a structure facing the exhaust flow path in the exhaust diffuser,
wherein:
the cooling device has
a guide part in which a guide flow path for circulating a cooling medium is formed, the guide part being configured to guide the cooling medium to the structure,
a valve part having a valve body that is movable to block the guide flow path in a first state and to open the guide flow path so as to widen a flow path area of the guide flow path in a second state, and
a supply part configured to supply the cooling medium at a first flow rate corresponding to a flow rate of the cooling medium flowing through the guide flow path during a rated operation of the gas turbine to the structure in the first state;
the guide part has an opening configured to accept outside air from an outside of the exhaust diffuser as the cooling medium;
the supply part is a linking hole defined in the guide part between the valve part and the structure so as to link the outside of the exhaust diffuser and the guide flow path, and the opening is further away from the structure than the valve body; and
the linking hole is one of a plurality of linking holes defined in the guide part and disposed about a circumference of the guide part.

2. The gas turbine according to claim 1, wherein the valve part has a drive part configured to move the valve body, and the cooling device has a failsafe part configured to make the flow rate of the cooling medium flowing through the guide flow path a second flow rate when the drive part cannot be controlled.

3. The gas turbine according to claim 1, wherein the exhaust diffuser has:
a tubular outer diffuser forming a portion of the exhaust flow path;
an inner diffuser inside the outer diffuser and defining the exhaust flow path together with the outer diffuser; and
a strut cover for linking the outer diffuser and the inner diffuser, and wherein the guide part has:
a strut cover guide part configured to guide the cooling medium to the strut cover as the structure; and
an outer diffuser guide part configured to guide the cooling medium to the outer diffuser as the structure.

4. The gas turbine according to claim 3, wherein the guide part has a flow rate adjusting part configured to adjust the flow rate of the cooling medium being guided to at least one of the strut cover guide part and the outer diffuser guide part.

5. The gas turbine according to claim 1, wherein the valve part is configured to switch between the first state and the second state based on a gas turbine output or a correlation value that is a value correlating to the gas turbine output.

6. A gas turbine comprising:
an exhaust diffuser in which an exhaust flow path for circulating exhaust gas from a turbine is formed; and
a cooling device for cooling a structure facing the exhaust flow path in the exhaust diffuser,
wherein:

the cooling device has a guide part in which a guide flow path for circulating a cooling medium is formed, the guide part being configured to guide the cooling medium to the structure, a valve part having a valve body that is movable to block the guide flow path in a first state and to open the guide flow path so as to widen a flow path area of the guide flow path in a second state, and a stopper part configured to form a gap between the guide part and the valve body in the first state such that the cooling medium is supplied through the gap at a first flow rate corresponding to a flow rate of the cooling medium flowing through the guide flow path during a rated operation of the gas turbine to the structure in the first state.

\* \* \* \* \*